United States Patent
Bagepalli (10) Patent No.: US 7,857,599 B2
(45) Date of Patent: Dec. 28, 2010

(54) METHOD AND APPARATUS FOR FORMING WIND TURBINE MACHINES

(75) Inventor: Bharat Sampathkumaran Bagepalli, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 992 days.

(21) Appl. No.: 11/621,690

(22) Filed: Jan. 10, 2007

(65) Prior Publication Data

US 2008/0166231 A1 Jul. 10, 2008

(51) Int. Cl.
*F03D 11/00* (2006.01)
(52) U.S. Cl. ............... 416/244 R; 416/DIG. 6; 415/908

(58) Field of Classification Search ............. 416/DIG. 6
See application file for complete search history.

(56) References Cited

U.S. PATENT DOCUMENTS

| | | | |
|---|---|---|---|
| 4,757,211 A * | 7/1988 | Kristensen | 290/55 |
| 5,213,470 A | 5/1993 | Lundquist | |
| 6,951,443 B1 | 10/2005 | Blakemore | |
| 7,004,724 B2 | 2/2006 | Pierce et al. | |
| 7,121,795 B2 | 10/2006 | Moroz et al. | |
| 7,168,251 B1 | 1/2007 | Janssen | |
| 7,614,850 B2 * | 11/2009 | Rogall | 416/244 R |
| 7,656,135 B2 * | 2/2010 | Schram et al. | 415/14 |
| 2004/0041408 A1 * | 3/2004 | Casazza | 290/55 |
| 2005/0230979 A1 * | 10/2005 | Bywaters et al. | 290/44 |
| 2006/0034692 A1 | 2/2006 | Grabau | |
| 2006/0220389 A1 | 10/2006 | Shibata et al. | |

\* cited by examiner

*Primary Examiner*—Richard Edgar
(74) *Attorney, Agent, or Firm*—James McGinness, Esq.; Armstrong Teasdale LLP (57) ABSTRACT

A wind turbine includes a nacelle connected to a unitary tube bedplate.

16 Claims, 8 Drawing Sheets

METHOD AND APPARATUS FOR FORMING WIND TURBINE MACHINES

BACKGROUND OF THE INVENTION

This invention relates generally to rotary machines and more particularly, to methods and apparatus for assembling and operating wind turbine machines.

Generally, a wind turbine includes a rotor having multiple blades. The blades, attached to rotatable hubs on these rotors, transform mechanical wind energy into a mechanical rotational torque that drives one or more generators. The generators are generally, but not always, rotationally coupled to the rotor through a gearbox. The gearbox steps up the inherently low rotational speed of the turbine rotor for the generator to efficiently convert the rotational mechanical energy to electrical energy, which is fed into a utility grid. Gearless direct drive wind turbine generators also exist. The rotor, generator, gearbox and other components are typically mounted within a housing, or nacelle, that is positioned on top of a base that may be a truss or tubular tower.

Some known nacelle configurations introduce substantial weight at the top of the wind turbine tower in order to facilitate support for the wind turbine components positioned within. The associated load support features of these nacelles facilitate increased weight at the top of the wind tower. The increased weight tends to increase capital and operational costs.

BRIEF DESCRIPTION OF THE INVENTION

In one aspect a wind turbine is provided that includes a nacelle connected to a unitary tube bedplate.

In another aspect a nacelle and bedplate structure is provided for a wind turbine. The structure includes a cap nacelle connected to a unitary tube bedplate.

In another aspect a method is provided of forming a bedplate structure for a wind turbine. The method includes forming a tubular member and forming two complimentary tube bedplates from the tubular member.

In another aspect a method is provided of forming a nacelle for a wind turbine. The method includes forming a bottom member having a top edge, forming a top member having a bottom edge that is complimentary in shape to the top edge, and attaching the bottom member to the top member along the top edge and the bottom edge such that the nacelle is a cap nacelle having a closed first end and an open second end.

In another aspect a method is provided of forming a wind turbine. The method includes forming a unitary bedplate structure from a tubular member such that the bed plate has a contoured open first end, forming a cap nacelle having a closed first end a contoured second open end, and attaching the first end of the bedplate to the second end of the cap nacelle to form a cap nacelle and tube bedplate structure.

DETAILED DESCRIPTION OF THE INVENTION

Figure 1:
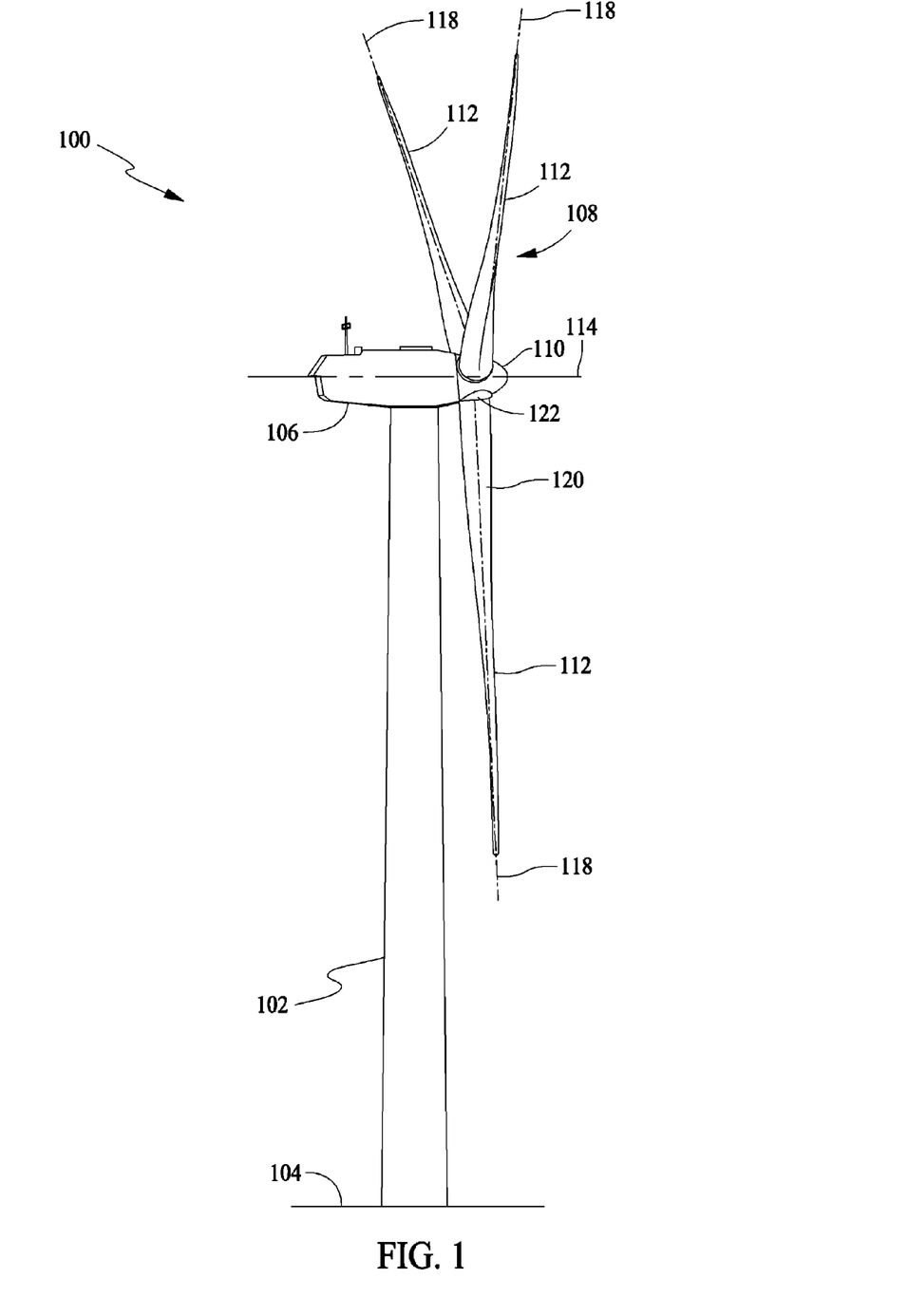
FIG. 1 is a schematic illustration of an exemplary wind turbine.

FIG. 1 is a schematic illustration of an exemplary wind turbine 100. In the exemplary embodiment, wind turbine 100 is a horizontal axis wind turbine. Alternatively, wind turbine 100 is a vertical axis wind turbine. Wind turbine 100 has a tower 102 extending from a supporting surface 104, a nacelle 106 mounted on tower 102, and a rotor 108 coupled to nacelle 106. Rotor 108 has a rotatable hub 110 and a plurality of rotor blades 112 coupled to hub 110. In the exemplary embodiment, rotor 108 has three rotor blades 112. In an alternative embodiment, rotor 108 includes more or less than three rotor blades 112. In the exemplary embodiment, tower 102 is fabricated from tubular steel and has a cavity (not shown in FIG. 1) extending between supporting surface 104 and nacelle 106. In an alternate embodiment, tower 102 is a lattice tower. The height of tower 102 is selected based upon factors and conditions known in the art.

Blades 112 are positioned about rotor hub 110 to facilitate rotating rotor 108 to transfer kinetic energy from the wind into usable mechanical energy, and subsequently, electrical energy. Blades 112 are mated to hub 110 by coupling a blade root portion 120 to hub 110 at a plurality of load transfer regions 122. Load transfer regions 122 have a hub load transfer region and a blade load transfer region (both not shown in FIG. 1). Loads induced in blades 112 are transferred to hub 110 via load transfer regions 122.

In the exemplary embodiment, blades 112 have a length between 50 meters (m) (164 feet (ft)) and 100 m (328 ft). Alternatively, blades 112 may have any length. As the wind strikes blades 112, rotor 108 is rotated about rotation axis 114. As blades 112 are rotated and subjected to centrifugal forces, blades 112 are subjected to various bending moments and other operational stresses. As such, blades 112 may deflect and/or rotate from a neutral, or non-deflected, position to a deflected position and associated stresses, or loads, may be induced in blades 112. Moreover, a pitch angle of blades 112, i.e., the angle that determines a perspective of blades 112 with respect to the direction of the wind, may be changed by a pitch adjustment mechanism (not shown in FIG. 1) to facilitate increasing or decreasing blade 112 speed by adjusting the surface area of blades 112 exposed to the wind force vectors. Pitch axis 118 for blades 112 are illustrated. In the exemplary embodiment, the pitches of blades 112 are controlled individually. Alternatively, blade pitch may be controlled as a group.

In some configurations, one or more microcontrollers in a control system (not shown in FIG. 1) are used for overall system monitoring and control including pitch and rotor speed regulation, yaw drive and yaw brake application, and fault monitoring. Alternatively, distributed or centralized control architectures are used in alternate embodiments of wind turbine 100.

In the exemplary embodiment, nacelle 106 is fabricated from a sturdy, light-weight, tube material formed in a range from approximately 1 to 20 millimeters (mm) (0.039 to 0.787 inches (in)) in thickness, the thickness being at least partially determined by predetermined wind loads. The materials include, but are not limited to aluminum alloys, steel alloys, fiber-reinforced composites or any other materials that attain predetermined operational parameters. Operational parameters include, but are not limited to, mitigating weight loads at a top of tower 102, providing sufficient material strength to withstand local environmental conditions, collecting loads from system 100 and other components within nacelle 106, efficiently and effectively transferring the loads to base 102 that subsequently transfers the loads to tower supporting surface 104, and withstanding the associated shear stresses induced within nacelle 106 as a result of these loads. In the exemplary embodiment, a weight of nacelle 106 is reduced by approximately 20% to 30% from some known nacelles. Tube fabrication methods typically include mass production features using standard forming and machining methods, thereby facilitating a decrease in manufacturing costs. In the exemplary embodiment, the tube portions are assembled to form nacelle 106 via retention hardware methods that include, but are not limited to, riveting and bolting. Alternatively, welding methods may be used to couple the sheets and/or plates. Also, alternatively, nacelle 106 may be cast or forged as a unitary member with the aforementioned operational parameters being adhered to.

Figure 2:
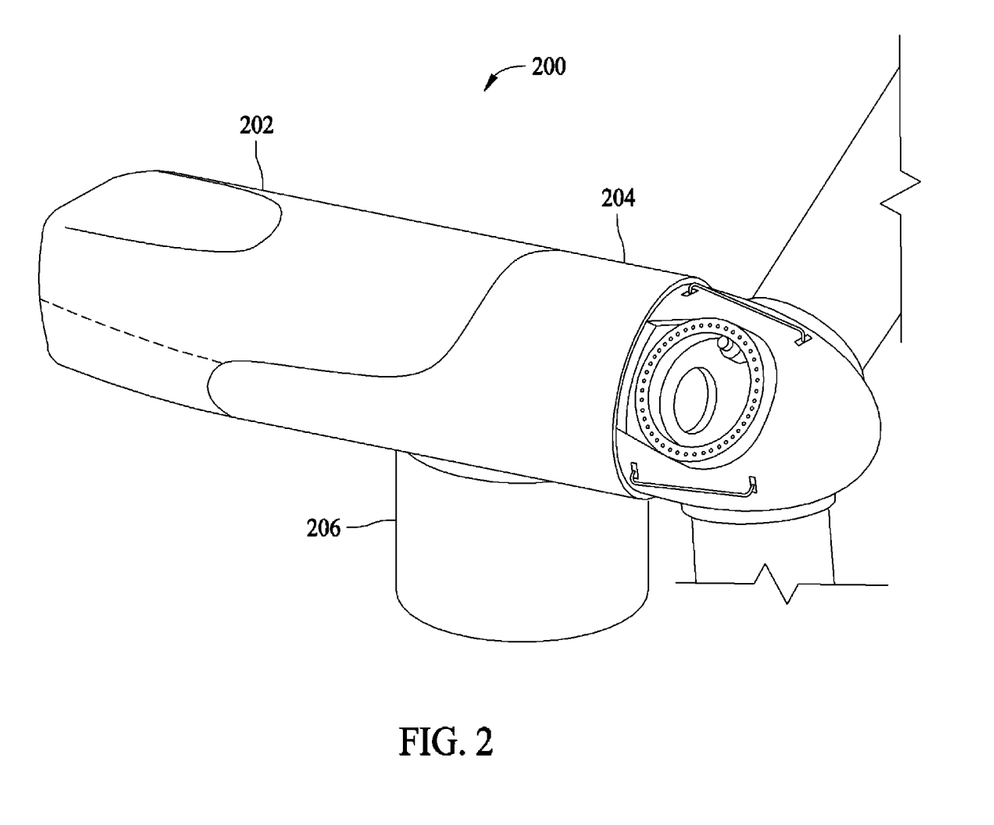
FIG. 2 is a schematic view of a wind turbine machine head constructed using a cap nacelle and tube bedplate that, in one embodiment, is used with the exemplary wind turbine shown in FIG. 1.

FIG. 2 is a schematic view of a wind turbine 200 including a cap nacelle 202 and a tube bedplate 204. Various components of wind turbine 200 are housed in cap nacelle 202 atop a tower 206 of wind turbine 200.

Figure 3:
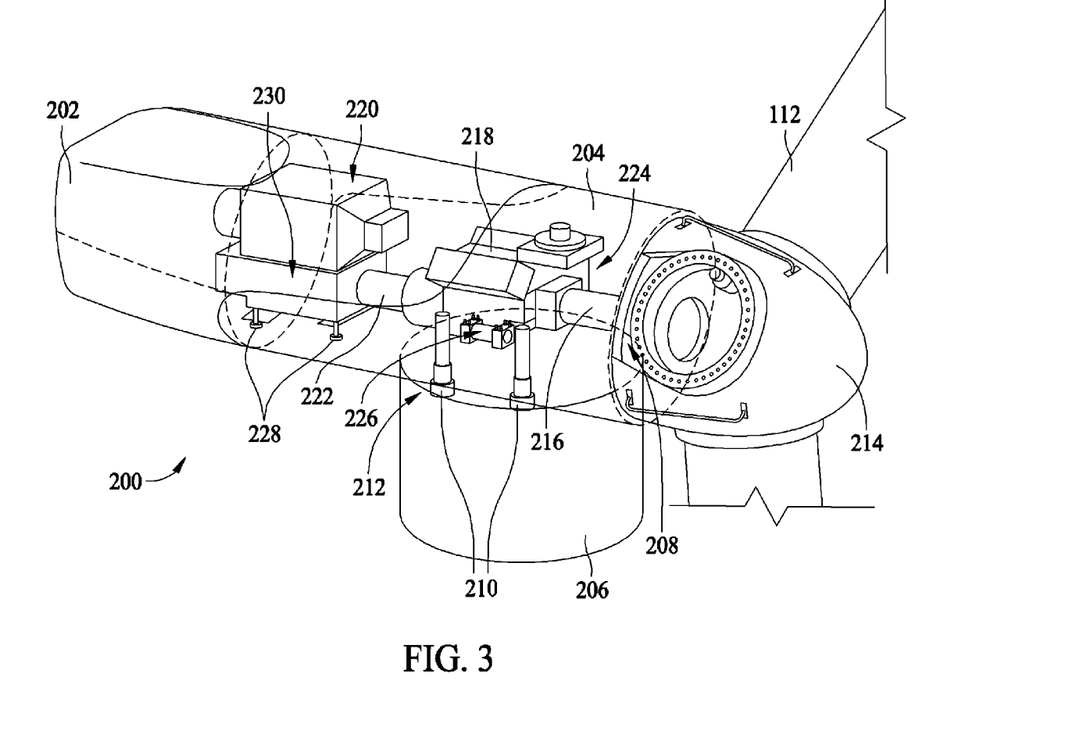
FIG. 3 is a fragmentary cross-sectional schematic view of an exemplary cap nacelle and tube bedplate structure that, in one embodiment, is used with the nacelle shown in FIG. 1.

FIG. 3 is a fragmentary cross-sectional schematic view of cap nacelle 202 and tube bedplate structure 204 of wind turbine 200. Various components of wind turbine 200 are housed in cap nacelle 202 and tube bedplate structure 204 atop tower 206 of wind turbine 200. In the exemplary embodiment, the machine head entities of wind turbine 200 are shown along with internal subsystems. The internal subsystems are integrated with cap nacelle 202 and tube bedplate 204. Tube bedplate 204 provides openings for a hub interface 208, a yaw drive interface 210 and a tower interface 212. A rotor hub 214 is rotatably coupled to a main rotor shaft 216 which is coupled directly to a gear box 218. Gear box 218 is rotatably coupled to an electric generator 220 with a flexible coupling 222. Also positioned in cap nacelle 202 and tube bedplate 204 is a main bearing mount 224, a gear box mount 226, a pair of generator mounts 228 and a top box mount 230.

In operation, loads associated with main rotor shaft 216 and equipment coupled to main rotor shaft 216 are transferred to cap nacelle 202 and/or tube bedplate 204. For example, rotational and bending loads of blades 112 are transferred to main rotor shaft 216 through rotor hub 214. The loads are transferred and are substantially evenly distributed throughout cap nacelle 202 and/or tube bedplate 204. In an alternative embodiment, additional components positioned within cap nacelle 202 and tube bedplate structure 204 may also be coupled to cap nacelle 202 and/or tube bedplate structure 204 in a similar manner as discussed above to further facilitate efficient and effective load transfer within wind turbine 200.

Cap nacelle 202 and/or tube bedplate 204 are fabricated from a sturdy, light-weight, material formed by methods that include, but are not limited to, casting, spray-formed composites, forging and machining. These materials include, but are not limited to, aluminum alloys, composites, steel alloys or any other materials that attain predetermined operational parameters. Operational parameters include, but are not limited to, providing sufficient material strength to withstand local environmental conditions, collecting loads from components within cap nacelle 202 and tube bedplate 204, and efficiently and effectively transferring the loads to cap nacelle 202 and/or tube bedplate 204.

Figure 4:
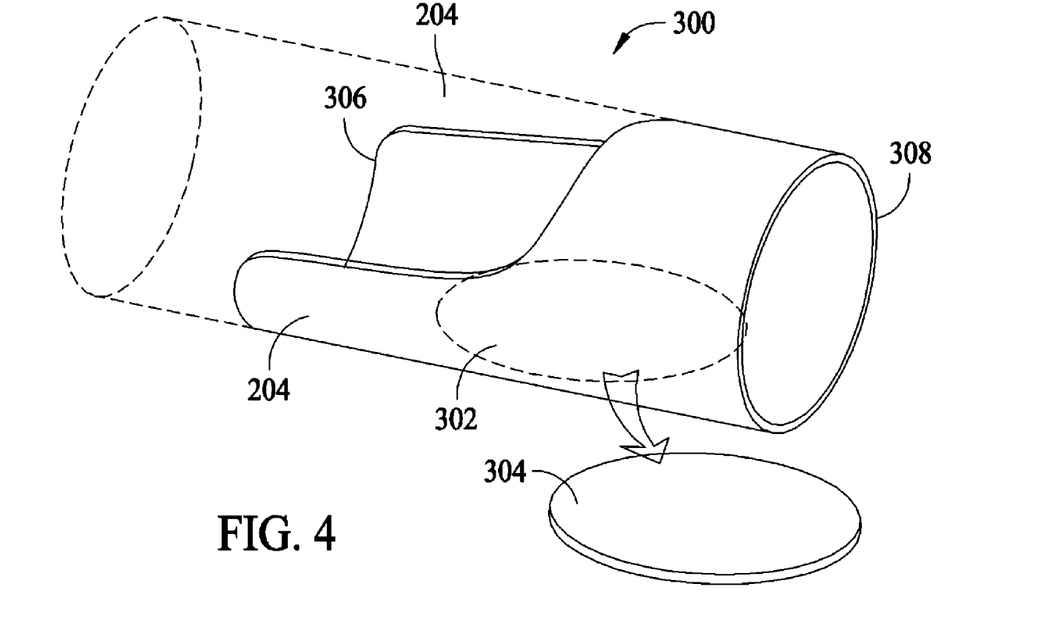
FIG. 4 is a schematic view of an exemplary tube bedplate structure that is constructed using two or more pieces with joints and/or seams.

FIG. 4 is a schematic view of a unitary member 300 utilized to form two tube bedplates 204. In one embodiment, tube bedplates 204 are formed by cutting two identical pieces from member 300. In an alternative embodiment, the pieces cut from member 300 are not identical. A bottom opening 302 is provided to tube bedplates 204 by removing a section 304 of tube bedplates 204 to provide tower access through tube bedplate 204. In one embodiment, section 304 has a disc shape and is used for stiffening of nacelle 106 (shown in FIG. 1) and/or the fabrication of brackets. Tube bedplate 204 includes a first end 306 having a contoured shape and a second end 308 having a circular shape. In one embodiment, tube bedplates 204 are formed from the same stock of material that is used to form tower 206 (shown in FIG. 2).

In one embodiment, all machine head entities are mounted directly to tube bedplate 204. Such entities include, but are not limited to, the main bearing (not shown in FIG. 4), the gearbox (not shown in FIG. 4), the generator (not shown in FIG. 4), the top box, i.e., electronic cabinet (not shown in FIG. 4), the heat exchanger (not shown in FIG. 4), the yaw drive (not shown in FIG. 4), and the cap nacelle (not shown in FIG. 4). As evident from their description, tube bedplate 204 is the main structural foundation on which all, or substantially all, machine head entities are mounted.

Figure 5:
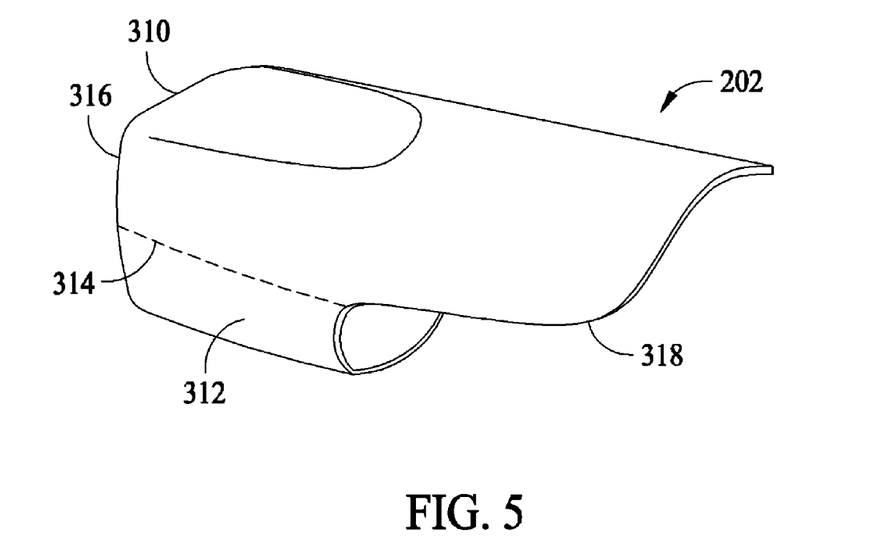
FIG. 5 is a schematic view of an exemplary cap nacelle structure that is constructed using two or more pieces with joints and/or seams.

FIG. 5 is a schematic view of cap nacelle 202. In the exemplary embodiment, cap nacelle 202 includes a top member 310 having a bottom edge and a bottom member 312 having a top edge. The bottom edge is complimentary in shape to the top edge. The bottom member is attached to the top member with joints and/or seams 314 formed by the attachment of the bottom edge to the top edge. The formed cap nacelle 202 includes a closed first end 316 and an open second end 318 that has a contour configured to mate with contoured first end 306 of tube bedplate 204. In an alternative embodiment, the cap nacelle is constructed using three or more pieces with joints and/or seams. Cap nacelle 202 is constructed as an integral member having rounded corners and edges with a curved contoured shape.

Figure 6:
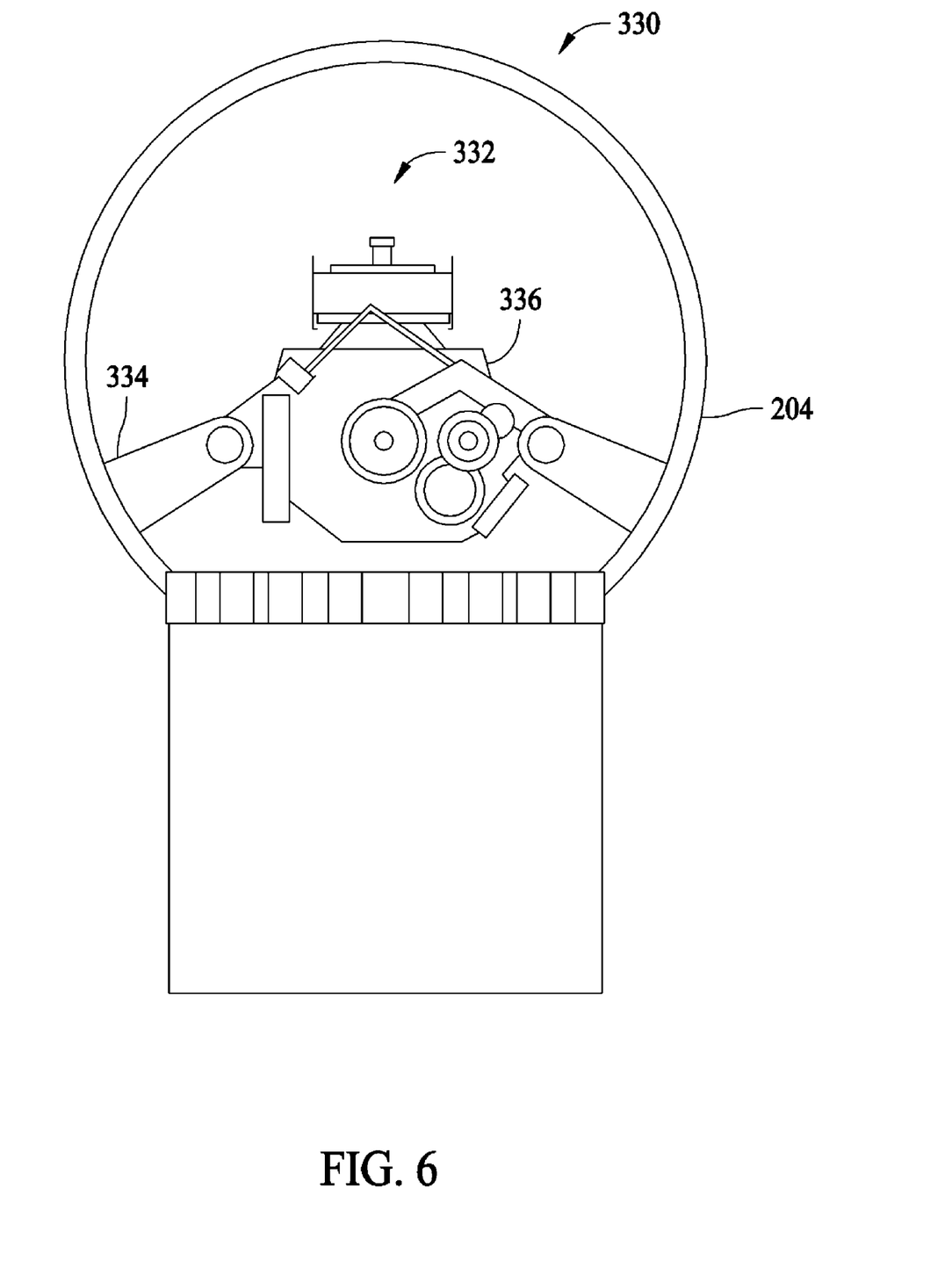
FIG. 6 is a fragmentary cross-sectional schematic view of an exemplary cap nacelle and tube bedplate structure illustrating mounted machine head entities.

FIG. 6 is a fragmentary cross-sectional schematic view of an exemplary cap nacelle and tube bedplate structure 330. In the exemplary embodiment, one example structure of mounting internal components to nacelle is illustrated. A gear box mount 332 includes a pair of welded brackets 334 directly mounted on tube bedplate 204. In an alternative embodiment, welded brackets 334 are off-the-shelf items that are welded directly to an inside of the tube. In the exemplary embodiment, welded brackets 334 facilitate support and alignment of gear box 336.

Figure 7:
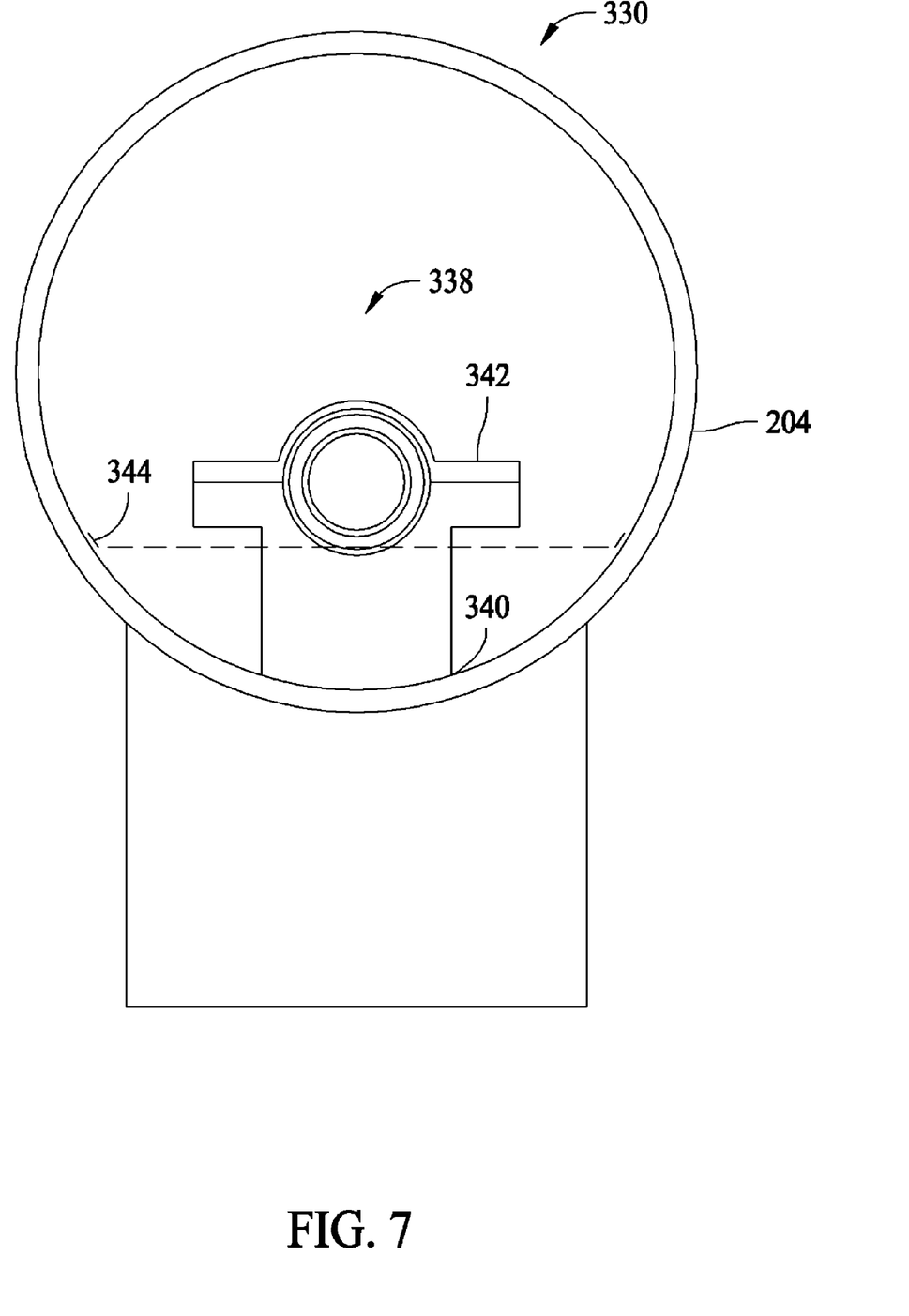
FIG. 7 is a fragmentary cross-sectional schematic view of another exemplary cap nacelle and tube bedplate structure illustrating additional mounted machine head entities.

FIG. 7 is another fragmentary cross-sectional schematic view of cap nacelle and tube bedplate structure 330 illustrating a main bearing mount 338. Main bearing mount 338 includes a welded support 340 configured to facilitate support and alignment of a pillow block bearing 342. In one embodiment, welded support 340 is welded directly to tube bedplate 204. A walking platform 344 is indicated to facilitate inspections and other operational activities requiring personnel to occupy and traverse within the enclosure area.

Figure 8:
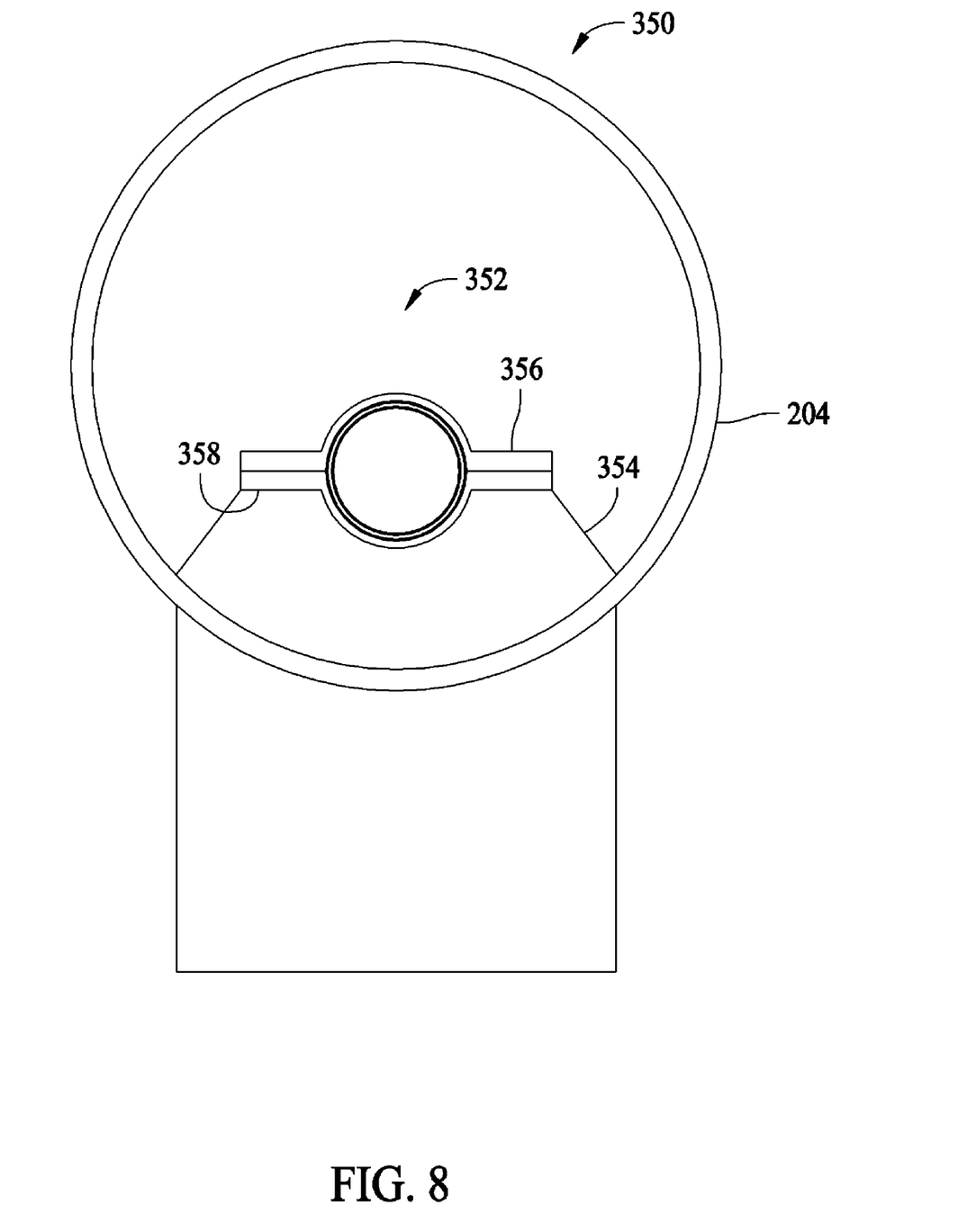
FIG. 8 is a fragmentary cross-sectional schematic view of an exemplary cap nacelle and tube bedplate structure illustrating an alternative mounting of machine head entities.

FIG. 8 is a fragmentary cross-sectional schematic view of cap nacelle and tube bedplate structure 350. Cap nacelle and tube bedplate structure 350 utilizes a second example structure of mounting nacelle internal components. A main bearing mount 352 includes a bracket 354 formed from disc shaped section 304 (shown in FIG. 4) that was removed from tube bedplate 204. Bracket 354 facilitates support and alignment of a pillow block bearing 356 and is welded directly to an inside of tube bedplate 204 and a bottom 358 of pillow block bearing 356. Bracket 354 provides the added advantage of stiffness due to the curvature in section 304. In one embodiment, a generator and other components are directly mounted in a rear region of tube bedplate 204.

Figure 9:
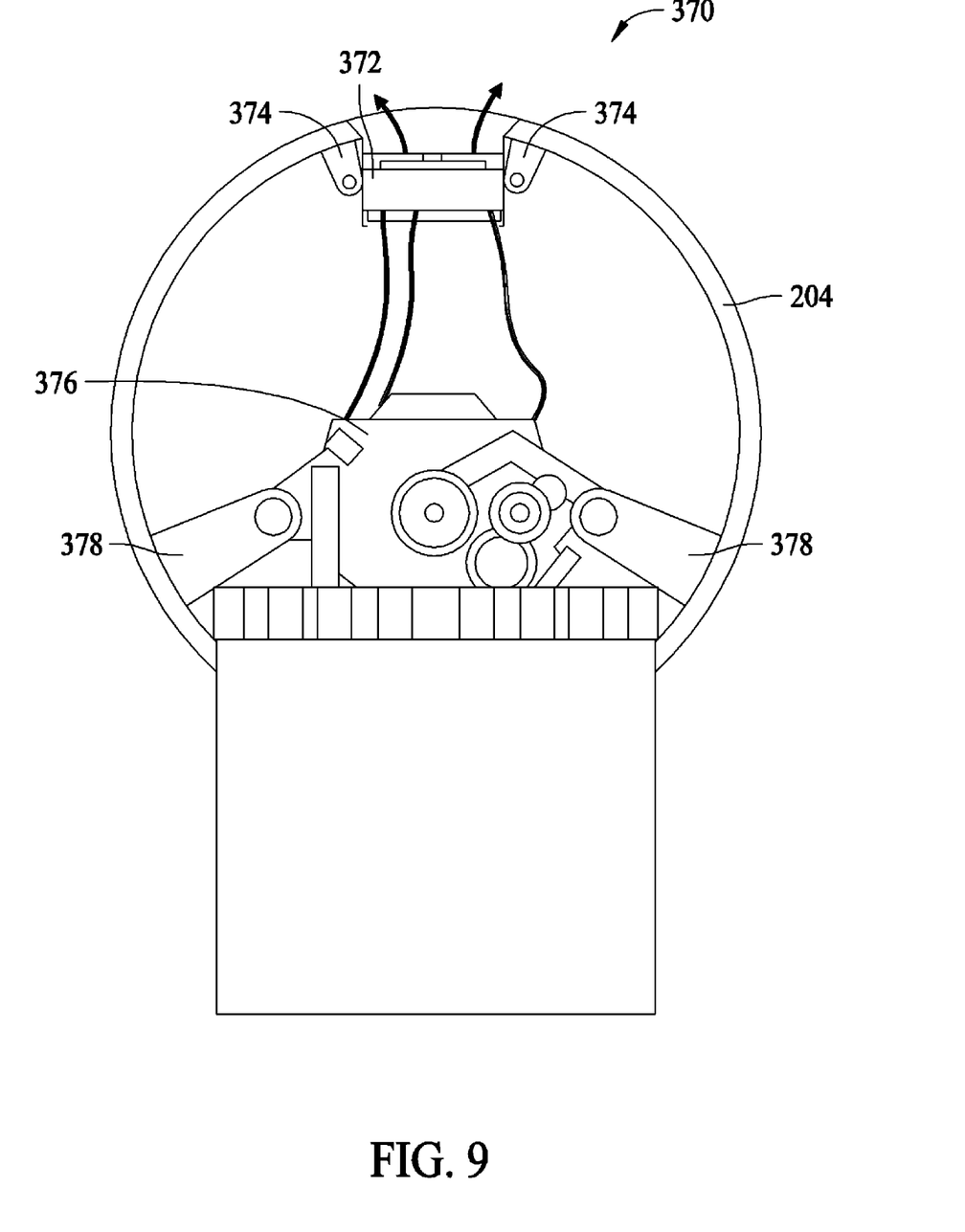
FIG. 9 is a fragmentary cross-sectional schematic view of an exemplary cap nacelle and tube bedplate structure illustrating another alternative mounting of machine head entities.

FIG. 9 is a fragmentary cross-sectional schematic view of a cap nacelle and tube bedplate structure 370. Cap nacelle and tube bedplate structure 370 utilizes a third example structure of mounting nacelle internal components. A heat exchanger 372 is mounted to an inside of a top of tube bedplate 204 with a pair of heat exchanger mounting brackets 374. In addition, a gear box 376 is mounted to a bottom of tube bedplate 204 with a pair of mounting brackets 378. As can be appreciated, other machine head entities can also be mounted to a top of tube bedplate 204. In addition, machine head entities can also be mounted to sides of tube bedplate 204. Such flexibility with regard to the mounting of machine head entities provides easy service and removal of lower components, direct and efficient venting to the outside of tube bedplate 204, and easier access to other devices and plumbing.

In general, any combination of tube bedplate and cap nacelle structure components as described herein may be used within tube bedplate 204 and cap nacelle 202 to attain predetermined operational parameters as also described herein.

The methods and apparatus for fabricating a wind turbine nacelle described herein facilitate operation of a wind turbine. More specifically, the tube bedplate and cap nacelle structure as described above facilitates an efficient and effective mechanical load transfer scheme. Also, the robust, nacelle structure facilitates decreased capital construction costs. Such nacelle structure also facilitates wind turbine reliability, and reduced maintenance costs and wind turbine outages.

Exemplary embodiments of wind turbine nacelle structures as associated with wind turbine generators are described above in detail. The example structures, apparatus and systems are not limited to the specific embodiments described herein nor to the specific illustrated wind turbine generators. While the invention has been described in terms of various specific embodiments, those skilled in the art will recognize that the invention can be practiced with modification within the spirit and scope of the claims.

What is claimed is:

1. A wind turbine comprising:
   a unitary tube bedplate comprising a contoured first end and an opening for communicating with a tower, wherein the opening is formed by removing a disc and said unitary bedplate has a diameter;
   a tubular nacelle connected to the unitary tube bedplate having a diameter equal to the diameter of the unitary tube bedplate, said nacelle comprising a closed first end and an open second end wherein the open second end is configured to mate with the contoured first end of the unitary tube bedplate; and
   a bracket for receiving a gear box or a main bearing, said bracket connected to an inner surface of the unitary tube bedplate, wherein said bracket is formed from the disc removed from the unitary tube bedplate such that a cross section of the bracket is curved.

2. A wind turbine in accordance with claim 1 wherein said nacelle comprises a cap nacelle.

3. A wind turbine in accordance with claim 2 wherein said cap nacelle comprises a top member and a bottom member welded together.

4. A wind turbine in accordance with claim 1 wherein said tube bedplate is formed from a single tubular member.

5. A wind turbine in accordance with claim 1 wherein said opening is formed by removing a punch-out disc.

6. A wind turbine in accordance with claim 1 further comprising at least one of a gear box and a main bearing mounted to said tube bedplate with at least one bracket.

7. A wind turbine in accordance with claim 1 wherein said tube bedplate is configured to have all machine head entities mounted thereto.

8. A wind turbine in accordance with claim 1 wherein said tube bedplate is configured to have at least one of a main bearing, a gear box, a generator, a top box, a heat exchanger, and a yaw drive mounted thereto.

9. A wind turbine in accordance with claim 1 wherein said tube bedplate is fabricated from a same stock that is used to fabricate a tower for said wind turbine.

10. A nacelle and bedplate structure for a wind turbine, said structure comprising;
    a unitary tube bedplate comprising a contoured first end and an opening for communicating with a tower, wherein the opening is formed by removing a disc and said unitary tube bedplate has a diameter;
    a cap nacelle having a diameter equal to the diameter of the unitary tube bedplate, said cap nacelle comprising a closed first end and an open second end wherein the open second end is configured to mate with the contoured first end of the unitary tube bedplate; and
    a bracket for receiving a gear box or a main bearing, said bracket configured to connect to an inner surface of the unitary tube bedplate, wherein said bracket is formed from the disc removed from the unitary tube bedplate such that a cross section of the bracket is curved.

11. A structure in accordance with claim 10 wherein said cap nacelle comprises a top member connected to a bottom member to form the closed first end and the open second end.

12. A structure in accordance with claim 10 wherein said opening of said unitary tube bedplate is formed by removing a punch-out disc from said unitary tube bedplate. tower.

13. A structure in accordance with claim 12 wherein said bracket is formed from the punch-out disc.

14. A method of forming a wind turbine, said method comprising:
    forming a unitary bedplate structure from a tubular member such that the unitary bed plate structure has a contoured open first end;
    forming a cap nacelle having a closed first end and a contoured second open end;
    attaching the first end of the bedplate structure to the second end of the cap nacelle to form a cap nacelle and tube bedplate structure;
    removing a section of the unitary bedplate structure to form an opening configured to communicate with a tower;
    utilizing the section to form a bracket for receiving one of a gear box mount or a main bearing mount; and
    attaching the bracket to an inside surface of the unitary bedplate structure.

15. A method in accordance with claim 14 wherein said method further comprising attaching at least one of a gear box mount or a main bearing mount to the bracket.

16. A method in accordance with claim 14 further comprising connecting a rotor hub to the unitary bedplate structure.

* * * * *